United States Patent
Cho

(10) Patent No.: US 8,736,985 B2
(45) Date of Patent: May 27, 2014

(54) PHOTOGRAPHIC LENS OPTICAL SYSTEM

(75) Inventor: Jae Hoon Cho, Gyeonggi-Do (KR)

(73) Assignee: Kolen Co., Ltd. (KR)

( * ) Notice: Subject to any disclaimer, the term of this patent is extended or adjusted under 35 U.S.C. 154(b) by 142 days.

(21) Appl. No.: 13/172,485

(22) Filed: Jun. 29, 2011

(65) Prior Publication Data

US 2012/0002302 A1    Jan. 5, 2012

(30) Foreign Application Priority Data

Jun. 30, 2010    (KR) ......................... 10-2010-0062769

(51) Int. Cl.
*G02B 9/34*    (2006.01)
*G02B 3/02*    (2006.01)

(52) U.S. Cl.
CPC ....................................... *G02B 9/34* (2013.01)
USPC ......................................... 359/773; 359/715

(58) Field of Classification Search
USPC ................................. 359/715, 771, 772, 773
See application file for complete search history.

(56) References Cited

U.S. PATENT DOCUMENTS 7,965,455 B2 *   6/2011   Okano ........................ 359/773
8,320,060 B2 *  11/2012   Jo ................................ 359/773

FOREIGN PATENT DOCUMENTS

| JP | 2008033327 A | 2/2008 |
| JP | 2009069196 A | 4/2009 |
| JP | 2009093149 A | 4/2009 |
| JP | 2009265245 A | 11/2009 |
| JP | 2010102162 A | 5/2010 |

\* cited by examiner

*Primary Examiner* — Jack Dinh
(74) *Attorney, Agent, or Firm* — St. Onge Steward Johnston & Reens LLC

(57) ABSTRACT

A lens optical system includes first to fourth lenses that are sequentially arranged from an object, and which are between the object and an image sensor on which an image of the object is formed. The first lens has a positive refractive power and an incident surface that is convex toward the object. The second lens has a negative refractive power and both surfaces that are concave. The third lens has a positive refractive power and has a meniscus shape that is convex toward the image sensor. The fourth lens has a negative refractive power and at least one of an incident surface and an exit surface thereof is an aspherical surface. The lens optical system may satisfy an inequality that 0.5<|tan θ|/f<1.5, where "θ" denotes an angle of view of the lens optical system and "f" denotes a focal length of the lens optical system.

14 Claims, 6 Drawing Sheets

PHOTOGRAPHIC LENS OPTICAL SYSTEM

CROSS-REFERENCE TO RELATED APPLICATIONS

This application claims the benefit of Korean Patent Application No. 10-2010-0062769, filed on Jun. 30, 2010, in the Korean Intellectual Property Office, the disclosure of which is incorporated herein in its entirety by reference.

FIELD OF THE INVENTION

The present invention relates to an optical device, and more particularly, to a lens optical system adopted in a camera.

BACKGROUND OF THE INVENTION

Cameras using solid state image devices, such as charge-coupled devices (CCDs) and complimentary metal oxide semiconductor (CMOS) image sensors, have been rapidly distributed.

Pixel integration degree of the solid state image devices has increased so as to increase the resolution of the cameras. Also, the cameras have been rapidly made compact and light due to the improvement in performance of lens optical systems built in the cameras.

In a general lens optical system of a camera, a large number of lenses are used to secure a performance of the lens optical system, e.g., to secure a large angle of view and to correct aberration. Nevertheless, when the lens optical system includes many lenses, it is difficult to make the camera compact and light. Thus, there is a demand to develop a lens optical system that is compact, has a wide angle of view, and is easy to correct aberration.

SUMMARY OF THE INVENTION

The present invention provides a lens optical system that is compact and light, has a wide angle of view, and exhibits superior performance.

According to an aspect of the present invention, a lens optical system includes first to fourth lenses that are sequentially arranged from an object, and which are between the object and an image sensor on which an image of the object is formed, wherein the first lens has a positive (+) refractive power and an incident surface that is convex toward the object, the second lens has a negative (−) refractive power and both surfaces that are concave, the third lens has a positive (+) refractive power and has a meniscus shape that is convex toward the image sensor, and the fourth lens has a negative (−) refractive power and at least one of an incident surface and an exit surface thereof is an aspherical surface.

An angle of view θ of the lens optical system and a focal length f of the lens optical system may satisfy an inequality that $0.5 < |\tan \theta| / f < 1.5$.

An overall length L of the lens optical system and a focal length f of the lens optical system may satisfy an inequality that $1.0 < L/f < 2.5$.

An exit surface of the first lens may be convex toward the image sensor or concave toward the image sensor.

At least one of the first to third lenses may be an aspherical lens.

At least one of an incident surface and an exit surface of at least one of the first to third lenses may be an aspherical surface.

Each of the incident surface and the exit surface of the fourth lens may have at least one inflection point from a center portion toward an edge thereof.

The incident surface of the fourth lens may have two or three inflection points from a center portion toward an edge thereof.

The exit surface of the fourth lens may have one inflection point from a center portion toward an edge thereof.

A center portion of the incident surface of the fourth lens may be convex toward the object and the incident surface of the fourth lens may gradually change to be concave and convex from the center portion toward an edge thereof, or the center portion of the incident surface of the fourth lens may be convex toward the object and the incident surface of the fourth lens may gradually change to be concave, convex, and concave from the center portion toward an edge thereof.

A center portion of the exit surface of the fourth lens may be concave toward the image sensor and the exit surface of the fourth lens may change to be convex toward an edge thereof.

The second and third lenses may be aberration correction lenses.

The lens optical system may further include an aperture arranged between the object and the first lens.

The lens optical system may further include an aperture arranged between the first lens and the second lens.

The lens optical system may further include an infrared ray prevention unit provided between the object and the image sensor.

The infrared ray prevention unit may be provided between the fourth lens and the image sensor.

At least one of the first to fourth lenses may be a plastic lens.

The angle of view (θ) of the lens optical system may be about 65° or higher.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
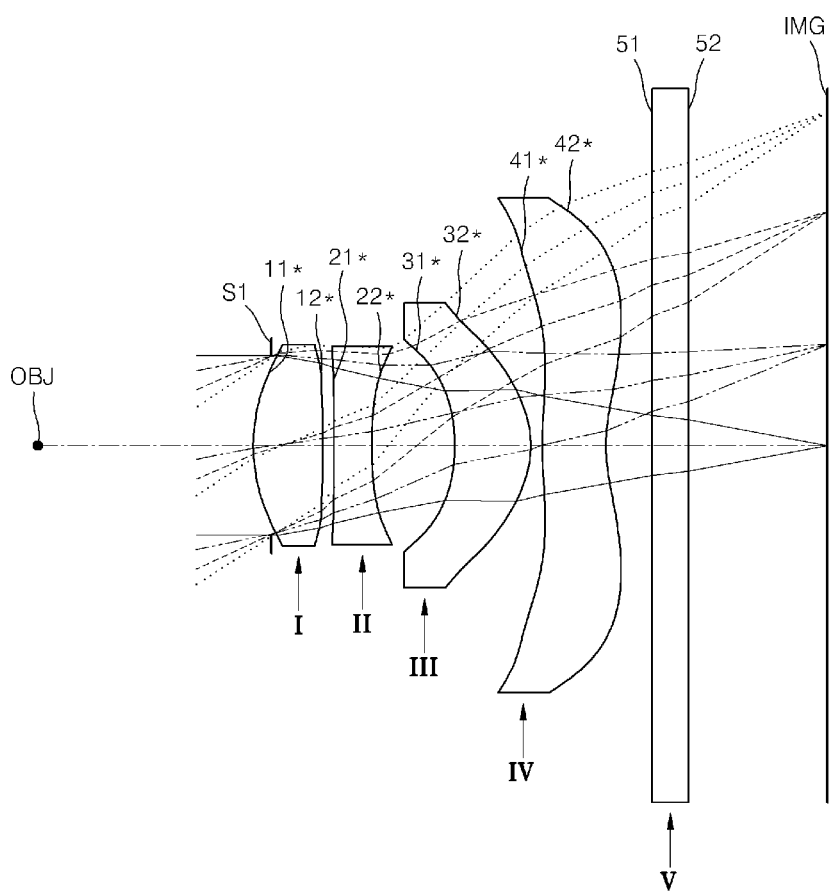
FIGS. 1 through 3 are sectional views illustrating an arrangement of main elements of lens optical systems according to first through third embodiments of the present invention.

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

Figure 2:
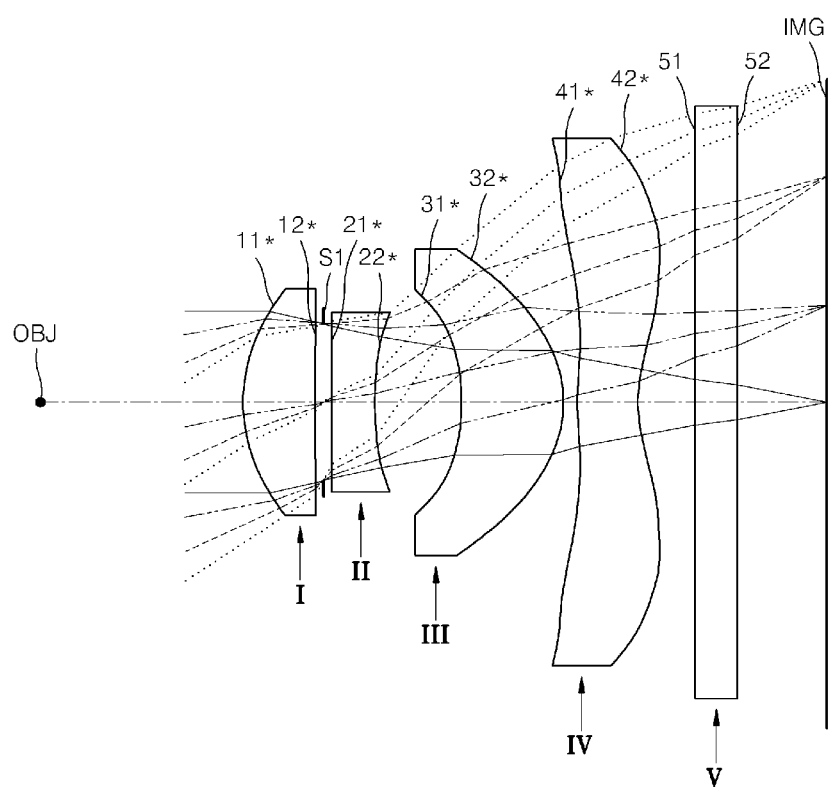
Figure 3:
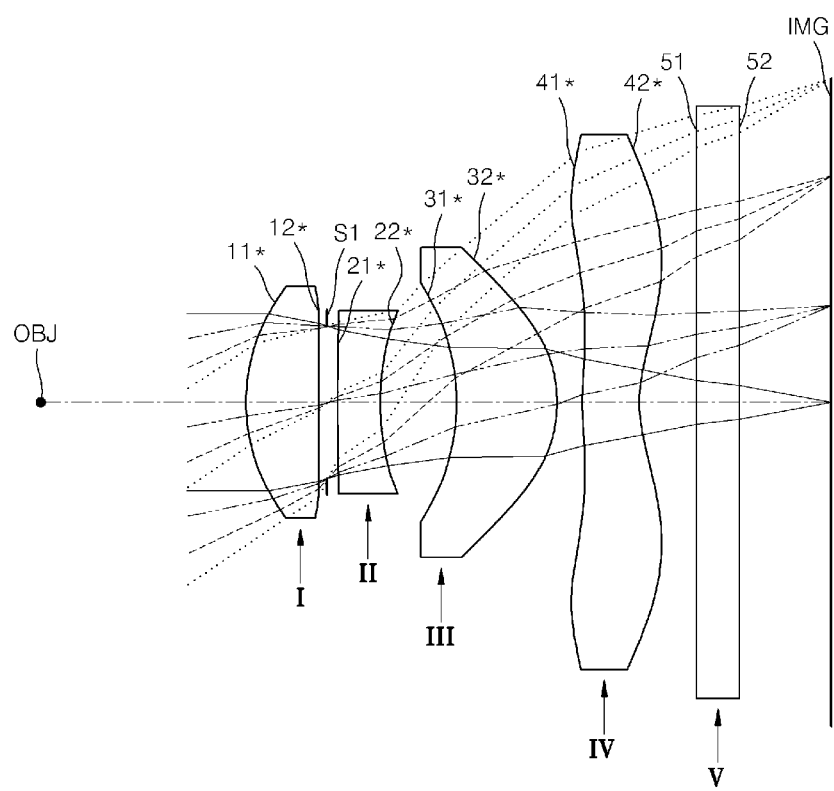

FIGS. 1 through 3 are sectional views illustrating an arrangement of main elements of lens optical systems according to first through third embodiments of the present invention.

Referring to FIGS. 1 through 3, a lens optical system according to each of the embodiments of the present invention includes a first lens I, a second lens II, a third lens III, and a fourth lens IV that are sequentially arranged from the side of an object OBJ, and which are located between the object OBJ and an image sensor IMG on which an image of the object OBJ is formed.

The first lens I may have a positive (+) refractive power. An incident surface 11* of the first lens I may be convex toward the object OBJ. An exit surface 12* of the first lens I may be convex or concave toward the image sensor IMG. In the embodiments of FIGS. 1 and 3, the exit surface 12* of the first lens I is convex toward the image sensor IMG. In the embodiment of FIG. 2, the exit surface 12* of the first lens I is concave toward the image sensor IMG. Thus, the first lens I may be a biconvex lens (FIGS. 1 and 3) or a meniscus lens convex toward the objective OBJ (FIG. 2).

The second lens II may have a negative (−) refractive power. Both surfaces, that is, an incident surface 21* and an exit surface 22*, of the second lens II may be concave.

The third lens III may be a meniscus lens convex toward the image sensor IMG and having a positive (+) refractive power. At least one of the first to third lenses I, II, and III may be an aspherical lens. In other words, at least one of the incident surfaces 11*, 21*, and 31* and the exit surfaces 12*, 22*, and 32* of at least one of the first to third lenses I, II, and III may be an aspherical surface. For example, all of the incident surfaces 11*, 21*, and 31* and the exit surfaces 12*, 22*, and 32* of each of the first to third lenses I, II, and III may be aspherical surfaces.

The fourth lens IV may have a negative (−) refractive power. At least one of an incident surface 41* and an exit surface 42* of the fourth lens IV may be an aspherical surface. For example, each of the incident surface 41* and an exit surface 42* of the fourth lens IV may be an aspherical surface having at least one inflection point from a center portion toward an edge thereof. The incident surface 41* of the fourth lens IV may have three inflection points from a center portion toward an edge thereof as in the embodiments shown in FIGS. 1 and 2, or two inflection points from a center portion toward an edge thereof as in the embodiment shown in FIG. 3. That is, the central portion of the incident surface 41* of the fourth lens IV may be convex toward the object OBJ and the incident surface 41* of the fourth lens IV may gradually change to be concave, convex, and concave from the central portion toward an edge thereof (FIGS. 1 and 2). Alternatively, the central portion of the incident surface 41* of the fourth lens IV may be convex toward the object OBJ and the incident surface 41* of the fourth lens IV may gradually change to be concave and convex from the central portion toward an edge thereof (FIG. 3). The exit surface 42* of the fourth lens IV may have one inflection point from a center portion toward an edge thereof (commonly in FIGS. 1-3). In this case, the center portion of the exit surface 42* of the fourth lens IV may be concave toward the image sensor IMG and the exit surface 42* of the fourth lens IV may change to be convex in a peripheral portion thereof. The first lens I may have a strong positive (+) refractive power and the second and third lenses II and III may function as aberration correction lenses.

The lens optical system may further include an aperture S1 and an infrared ray prevention unit V. The aperture S1, as shown in FIG. 1, may be provided at a side of the first lens I which is toward the object OBJ. That is, the aperture S1 may be provided between the object OBJ and the first lens I. Alternatively, the aperture S1 may be provided between the first lens I and the second lens II as shown in FIGS. 2 and 3. The infrared ray prevention unit V, as shown in FIGS. 1 through 3, may be provided between the fourth lens IV and the image sensor IMG. The infrared ray prevention unit V may be an infrared ray prevention filter. The positions of the aperture S1 and the infrared ray prevention unit V may be changed.

The lens optical systems configured as above according to the above-described embodiments may satisfy at least one of the following Inequalities 1 and 2.

$$0.5 < |\tan \theta|/f < 1.5 \qquad \text{[Inequality 1]}$$

In Inequality 1, "θ" denotes an angle of view of the lens optical system, and "f" denotes a focal length of the overall lens optical system.

Inequality 1 expresses conditions for determining an angle of view of the lens optical system. When "|tan θ|/f" is equal to or lower than a lower limit of 0.5 in Inequality 1, although spherical aberration and coma aberration may decrease, an angle of view decreases as well. In contrast, when "|tan θ|/f" is equal to or greater than an upper limit of 1.5 in Inequality 1, although it is advantageous to extend an angle of view, spherical aberration and coma aberration may increase. When the conditions of Inequality 1 are satisfied, while spherical aberration and coma aberration are maintained in a good state, a wide angle of view may be obtained.

$$1.0 < L/f < 2.5 \qquad \text{[Inequality 2]}$$

In Inequality 2, "L" denotes a length of the overall lens optical system, that is, an overall length, and "f" denotes a focal length of the overall lens optical system.

Inequality 2 expresses conditions for making the lens optical system compact. In Inequality 2, when "L/f" is equal to or lower than a lower limit of 1.0, although it is advantageous to make a lens optical system compact, spherical aberration may increase. In contrast, when "L/f" is equal to or greater than an upper limit of 2.5, although it is advantageous to correct spherical aberration, the overall length of the lens optical system increases so that it may be difficult to make the lens optical system compact.

In the above-described embodiments of the present invention, the values of Inequalities 1 and 2 are shown in Tables 1 and 2. In Tables 1 and 2, the unit of an angle of view (θ) is ° and the unit of "f" and "L" is mm.

TABLE 1

| Classification | Θ | F | Inequality 1 (0.5 < \|tanθ\|/f < 1.5) |
|---|---|---|---|
| 1$^{st}$ embodiment | 67 | 4.242 | 0.555 |
| 2$^{nd}$ embodiment | 66 | 3.429 | 0.655 |
| 3$^{rd}$ embodiment | 68 | 3.341 | 0.741 |

TABLE 2

| Classification | L | f | Inequality 2 (1.0 < L/f < 2.5) |
|---|---|---|---|
| 1$^{st}$ embodiment | 4.870 | 4.242 | 1.148 |
| 2$^{nd}$ embodiment | 4.100 | 3.429 | 1.196 |
| 3$^{rd}$ embodiment | 4.100 | 3.341 | 1.227 |

Referring to Tables 1 and 2, it can be seen that the lens optical systems of the first to third embodiments satisfy Inequalities 1 and 2.

In the lens optical systems according to the above-described embodiments, the first to fourth lenses I, II, III and IV may be manufactured of plastic in consideration of the shape and dimension thereof. That is, the first to fourth lenses I, II, III and IV may be all plastic lenses. For a glass lens, a manufacturing cost is high and conditions for forming are strict, so that it may be difficult to make a compact lens optical system. However, in the embodiments of the present invention, since the first to fourth lenses I, II, III and IV may be all manufactured of plastic, a variety of advantages according thereto may be obtained. Nevertheless, in the present invention, the material of the first to fourth lenses I, II, III and IV is not limited to plastic. If necessary, at least one of the first to fourth lenses I, II, III and IV may be manufactured of glass.

The lens optical systems according to the above-described embodiments of the present invention will be described in detail with reference to lens data and the accompanying drawings.

Tables 3 through 5 each shows curvature radiuses, lens thicknesses or distances between lenses, refractive indexes, and the Abbe numbers of lenses constituting the lens optical system of FIGS. 1 through 3. In Tables 3 through 5, "R" denotes a curvature radius, "D" denotes a lens thickness or a distance between lenses or neighboring constituent elements, "$N_d$" denotes a refractive index of a lens measured by using a d-line, and "$V_d$" denotes the Abbe number. In numbers of the surfaces of the lenses in Tables 3 through 5, the mark * denotes that a corresponding lens surface is an aspherical surface. The unit of R and D is millimeters (mm).

TABLE 3

| 1$^{st}$ embodiment | Surface | R | D | $N_d$ | $V_d$ |
|---|---|---|---|---|---|
|  | S1 | Infinity |  |  |  |
| I | 11* | 1.4200 | 0.5884 | 1.54 | 56.09 |
|  | 12* | −43.1251 | 0.1000 |  |  |
| II | 21* | −10.0000 | 0.3212 | 1.63 | 23.41 |
|  | 22* | 4.5169 | 0.7011 |  |  |
| III | 31* | −1.2013 | 0.6408 | 1.53 | 55.73 |
|  | 32* | −0.8861 | 0.1009 |  |  |
| IV | 41* | 5.5158 | 0.5374 | 1.53 | 55.73 |
|  | 42* | 1.4640 | 0.4000 |  |  |
| V | 51 | Infinity | 0.3000 | 1.51 | 64.17 |
|  | 52 |  | 1.1758 |  |  |
|  | IMG | Infinity | 0.0042 |  |  |

TABLE 4

| 2$^{nd}$ embodiment | Surface | R | D | $N_d$ | $V_d$ |
|---|---|---|---|---|---|
| I | 11* | 1.1200 | 0.5029 | 1.54 | 56.09 |
|  | 12* | 400.0000 | 0.0580 |  |  |
|  | S1 | infinity | 0.0600 |  |  |
| II | 21* | −15.9687 | 0.3000 | 1.63 | 23.52 |
|  | 22* | 2.9211 | 0.6046 |  |  |
| III | 31* | −1.4267 | 0.7133 | 1.53 | 55.86 |
|  | 32* | −0.8133 | 0.1000 |  |  |
| IV | 41* | 3.1986 | 0.4211 | 1.53 | 55.86 |
|  | 42* | 0.9769 | 0.4000 |  |  |
| V | 51 | infinity | 0.3000 | 1.51 | 64.17 |
|  | 52 |  | 0.6393 |  |  |
|  | IMG | infinity | 0.0006 |  |  |

TABLE 5

| 3$^{rd}$ embodiment | Surface | R | D | $N_d$ | $V_d$ |
|---|---|---|---|---|---|
| I | 11* | 1.3061 | 0.5021 | 1.54 | 56.09 |
|  | 12* | −14.9015 | 0.0600 |  |  |
|  | S1 | infinity | 0.0700 |  |  |
| II | 21* | −39.0726 | 0.3000 | 1.63 | 23.52 |
|  | 22* | 2.3048 | 0.5322 |  |  |
| III | 31* | −1.7110 | 0.7077 | 1.53 | 55.86 |
|  | 32* | −0.8432 | 0.1759 |  |  |
| IV | 41* | 3.0596 | 0.4000 | 1.53 | 55.86 |
|  | 42* | 0.9804 | 0.4000 |  |  |
| V | 51 | infinity | 0.3000 | 1.51 | 64.17 |
|  | 52 |  | 0.6418 |  |  |
|  | IMG | infinity | 0.0004 |  |  |

The aperture ratio (Fno), focal length (f), and angle of view (θ) of each lens optical system according to the first through third embodiments of the present invention corresponding to FIGS. 1 through 3 are shown in Table 6.

TABLE 6

| Classification | Aperture Ratio (Fno) | Focal Length (f) [mm] | Angle of view (θ) [°] |
|---|---|---|---|
| 1$^{st}$ embodiment | 2.8 | 4.242 | 67 |
| 2$^{nd}$ embodiment | 2.7 | 3.429 | 66 |
| 3$^{rd}$ embodiment | 2.7 | 3.341 | 68 |

Also, the aspherical surface of each lens of the lens optical systems according to the first through third embodiments of the present invention satisfy the following aspherical surface equation.

< Aspherical surface equation >

$$x = \frac{c'y^2}{1 + \sqrt{1 - (K+1)c'^2 y^2}} + Ay^4 + By^6 + Cy^8 + Dy^{10} + Ey^{12} + Fy^{14} + Gy^{16} + Hy^{18} + Jy^{20}$$

In the above aspherical surface equation, "x" denotes a distance from the apex of a lens in a direction along an optical axis, "y" denotes a distance in a direction perpendicular to the optical axis, "c'" denotes a reciprocal number (=1/r) of a curvature radius at the apex of a lens, "K" denotes a conic constant, and "A, B, C, D, E, F, G, H, and J" each denotes an aspherical surface coefficient.

Tables 7 through 9 show aspherical surface coefficients of aspherical surfaces of the lens optical systems according to the first through third embodiments corresponding to FIGS. 1 through 3. That is, Tables 7 through 9 show aspherical surface coefficients of incident surfaces 11*, 21*, 31*, and 41* and exit surfaces 12*, 22*, 32*, and 42* of the respective lenses of Tables 3 through 5.

TABLE 7

|   | 11* | 12* | 21* | 22* | 31* | 32* | 41* | 42* |
|---|---|---|---|---|---|---|---|---|
| K | 0.2909 | −100.0000 | −203.5746 | 12.5935 | 0.5268 | −3.7593 | −29.0589 | −11.4076 |
| A | −0.0240 | 0.0161 | 0.1330 | 0.1811 | 0.1109 | −0.2611 | −0.1134 | −0.0941 |
| B | −0.0117 | −0.1462 | −0.2028 | −0.0843 | −0.1873 | 0.1634 | 0.0306 | 0.0310 |
| C | −0.0553 | −0.1043 | −0.0292 | 0.0344 | 0.2037 | −0.0820 | −0.0005 | −0.0094 |
| D | −0.0323 | 0.0114 | 0.0523 | 0.0201 | −0.1464 | −0.0307 | −0.0007 | 0.0014 |
| E | 0.0051 | 0.0686 | 0.1705 | 0.0691 | 0.0856 | 0.0351 | — | 0.0001 |
| F | 0.0046 | 0.1047 | 0.0756 | 0.2854 | 0.1276 | 0.0145 | — | — |
| G | −0.0717 | −0.0432 | −0.1230 | −0.3247 | −0.0273 | 0.0005 | — | — |
| H | −0.0751 | −0.1839 | −0.0631 | −0.0369 | −0.0154 | −0.0065 | — | — |

TABLE 8

|   | 11* | 12* | 21* | 22* | 31* | 32* | 41* | 42* |
|---|---|---|---|---|---|---|---|---|
| K | −0.1005 | — | — | — | −11.0427 | −0.7863 | −100.0000 | −7.3666 |
| A | 0.0190 | 0.0944 | 0.2277 | 0.2749 | −0.5145 | 0.1186 | −0.2517 | −0.1950 |
| B | −0.0388 | −0.0501 | −0.2666 | −0.1223 | 0.4306 | −0.2106 | 0.1795 | 0.1185 |
| C | 0.3059 | −0.2762 | −0.3994 | 0.0533 | −0.9935 | 0.2793 | −0.0531 | −0.0558 |
| D | −0.6031 | −0.0709 | 1.3050 | −0.1179 | 0.8324 | −0.3992 | 0.0062 | 0.0161 |
| E | −0.3906 | 1.9398 | −2.0498 | 1.0386 | −0.0299 | 0.2605 | — | −0.0024 |
| F | 2.8288 | −6.8968 | 0.0299 | −1.0405 | 0.7239 | 0.0604 | — | 0.0001 |
| G | −2.9238 | 6.5793 | — | — | −1.4626 | −0.0791 | — | — |
| H | — | — | — | — | — | — | — | — |

TABLE 9

|   | 11* | 12* | 21* | 22* | 31* | 32* | 41* | 42* |
|---|---|---|---|---|---|---|---|---|
| K | −0.1166 | — | — | — | −18.6963 | −0.7847 | −100.0000 | −7.6609 |
| A | 0.0078 | 0.1180 | 0.2282 | 0.2415 | −0.4449 | 0.1183 | −0.2366 | −0.1845 |
| B | 0.0229 | −0.0882 | −0.3702 | −0.2064 | 0.4070 | −0.1974 | 0.1746 | 0.1106 |
| C | 0.0548 | −0.4582 | −0.3910 | 0.1158 | −0.6582 | 0.2273 | −0.0538 | −0.0521 |
| D | −0.2319 | 0.9915 | 2.2018 | −0.0101 | 0.9211 | −0.2954 | 0.0073 | 0.0151 |
| E | −0.1138 | 0.7984 | −3.2362 | 0.8848 | −0.5771 | 0.2738 | −0.0001 | −0.0022 |
| F | 1.2395 | −6.6714 | 0.0292 | −1.3882 | 0.4391 | −0.0250 | — | 0.0001 |
| G | −1.4320 | 6.4260 | — | — | −0.2087 | −0.0435 | — | — |
| H | — | — | — | — | — | — | — | — |

Figure 4:
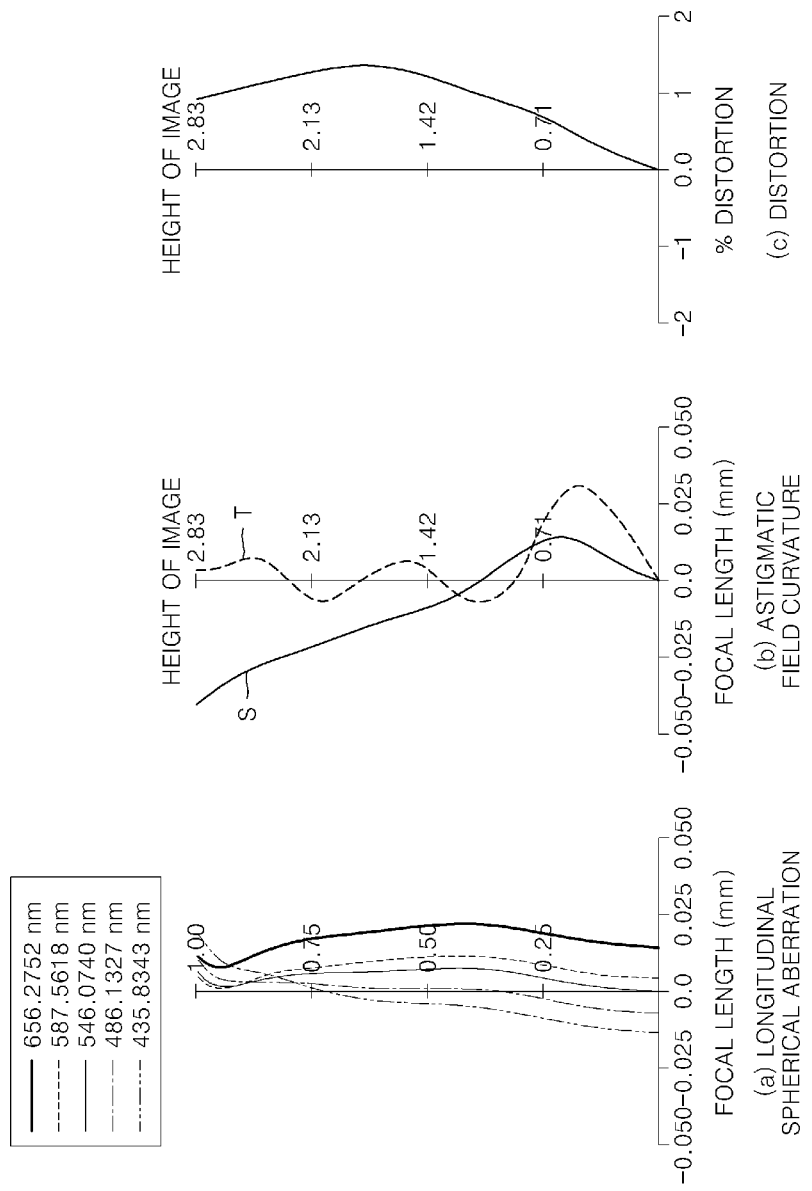
FIG. 4 is an aberration diagram illustrating longitudinal spherical aberration, astigmatic field curvature, and distortion of a lens optical system according to a first embodiment of the present invention.

FIG. 4 is an aberration diagram illustrating longitudinal spherical aberration, astigmatic field curvature, and distortion of the lens optical system according to the first embodiment of the present invention shown in FIG. 1, that is, the lens optical system having data of Table 3. In FIG. 4, an aberration diagram (a) illustrates longitudinal spherical aberration of a lens optical system with respect to light of various wavelengths. An aberration diagram (b) illustrates an astigmatic field curvature of a lens optical system, that is, a tangential field curvature T and a sagittal field curvature S. The wavelengths of light used to obtain data of the aberration diagram (a) are 435.8343 nm, 486.1327 nm, 546.0740 nm, 587.5618 nm, and 656.2725 nm. The wavelength of light used to obtain data of the aberration diagrams (b) and (c) is 546.0740 nm. The same wavelengths are used in FIGS. 5 and 6.

Figure 5:
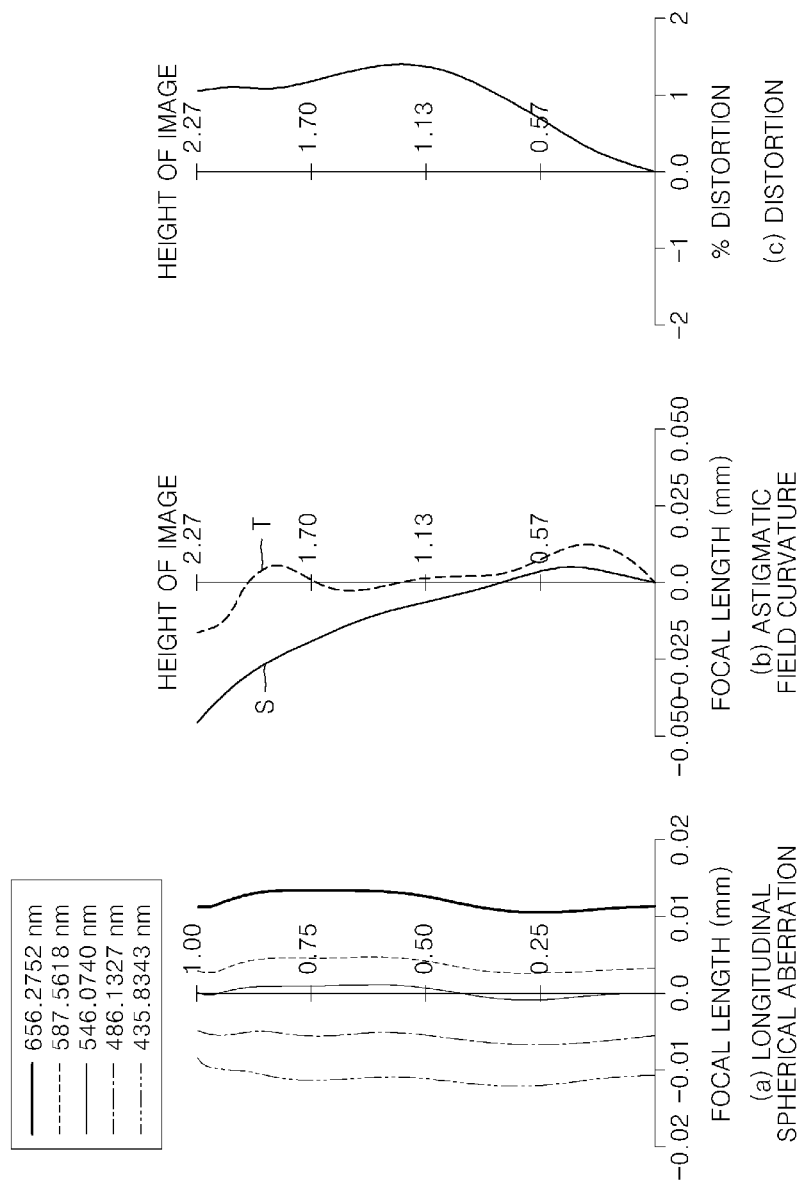
FIG. 5 is an aberration diagram illustrating longitudinal spherical aberration, astigmatic field curvature, and distortion of a lens optical system according to a second embodiment of the present invention.

Aberration diagrams (a), (b), and (c) of FIG. 5 respectively illustrate longitudinal spherical aberration, astigmatic field curvature, and distortion of the lens optical system according to the second embodiment of the present invention shown in FIG. 2, that is, the lens optical system having data of Table 4.

Figure 6:
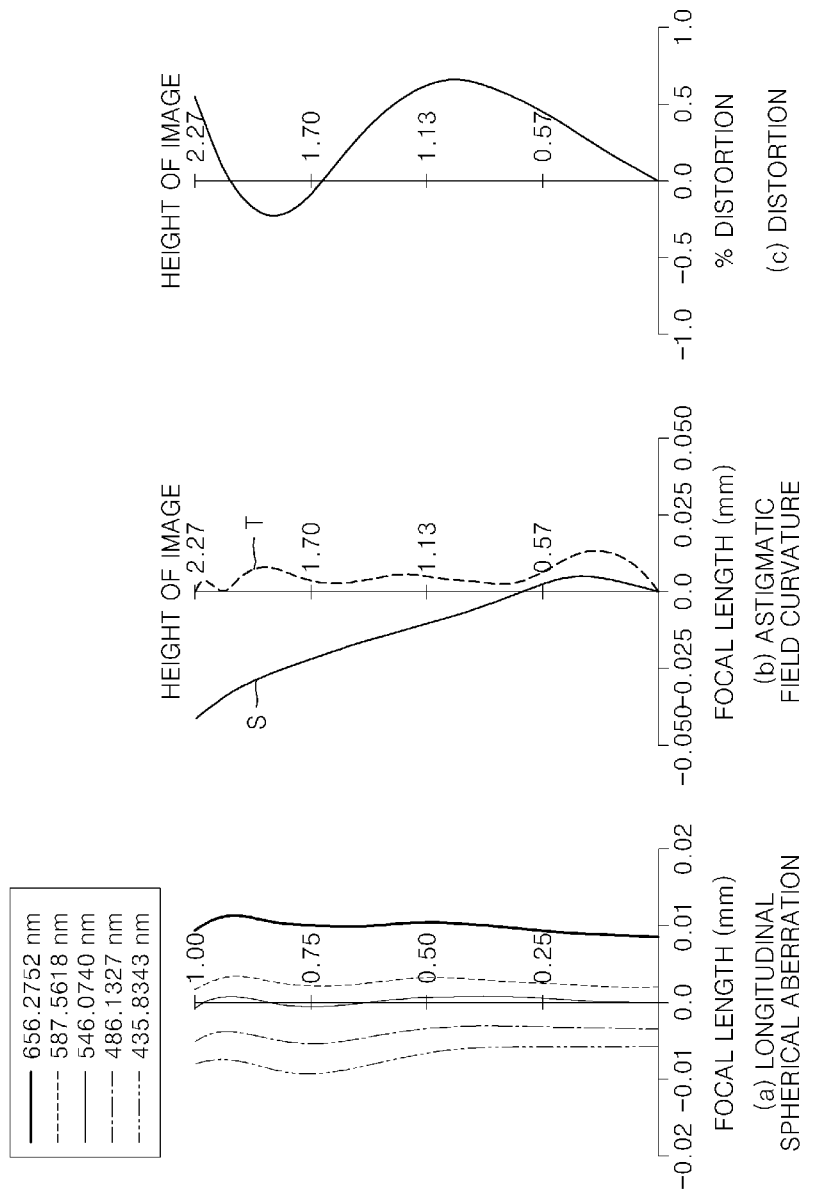
FIG. 6 is an aberration diagram illustrating longitudinal spherical aberration, astigmatic field curvature, and distortion of a lens optical system according to a third embodiment of the present invention.

Aberration diagrams (a), (b), and (c) of FIG. 6 respectively illustrate longitudinal spherical aberration, astigmatic field curvature, and distortion of the lens optical system according to the third embodiment of the present invention shown in FIG. 3, that is, the lens optical system having data of Table 5.

As described above, the lens optical system according to the present invention includes the first to fourth lenses I, II, III and IV respectively having positive (+), negative (−), positive (+), and negative (−) refractive powers and sequentially arranged in a direction from the object OBJ to the image sensor IMG, and may satisfy at least one of Inequalities 1 and 2. The lens optical system including four lenses may have a wide angle of view of about 65° or higher, have a relatively short overall length of about 4.1-4.8 mm, and easily correct various aberrations. Thus, according to the present invention, a lens optical system having a wide angle of view and a high resolution while being compact (small) and light may be embodied.

Also, as described above, by manufacturing the first to fourth lenses I, II, III and IV of plastic and forming at least one of both surfaces, that is, an incident surface and an exit surface, of each lenses to be an aspherical surface, a lens optical system that is compact and exhibits superior performance may be embodied at a low cost compared to a case of using a glass lens.

While this invention has been particularly shown and described with reference to exemplary embodiments thereof, it will be understood by those skilled in the art that various changes in form and details may be made therein without departing from the spirit and scope of the invention as defined by the appended claims. For example, a shield film may be used instead of a filter as the infrared ray prevention unit V. Also, the positions of the infrared ray prevention unit V and the aperture S1 may be changed. Therefore, the scope of the invention is defined not by the detailed description of the invention but by the appended claims.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A lens optical system comprising first to fourth lenses that are sequentially arranged from an object, and which are between the object and an image sensor on which an image of the object is formed,
wherein the first lens has a positive (+) refractive power and an incident surface that is convex toward the object, the second lens has a negative (−) refractive power and both surfaces that are concave, the third lens has a positive (+) refractive power and has a meniscus shape that is convex toward the image sensor, and the fourth lens has a negative (−) refractive power and at least one of an incident surface and an exit surface thereof is an aspherical surface, and
wherein the lens optical system satisfies the following inequality, $$0.5 < |\tan \theta|/f < 1.5,$$

wherein "θ" denotes an angle of view of the lens optical system and "f" denotes a focal length of the lens optical system,
wherein the angle of view (θ) of the lens optical system is greater than or equal to 66°,
wherein a central portion of the incident surface of the fourth lens is convex toward the object and a portion around the central portion of the incident surface is concave toward the object,
wherein the incident surface of the fourth lens has two or three inflection points from the center portion toward an edge thereof,
wherein the center portion of the incident surface of the fourth lens is convex toward the object and the incident surface of the fourth lens gradually changes to be concave and convex from the center portion toward an edge thereof, or the center portion of the incident surface of the fourth lens is convex toward the object and the incident surface of the fourth surface gradually changes to be concave, convex, and concave from the center portion toward an edge thereof, and
wherein the angle of view (θ) of the lens optical system is smaller than 70°, the focal length (f) of the lens optical system is smaller than 4.5 mm, and an overall length (L) of the lens optical system is smaller than 5 mm.

2. The lens optical system of claim 1, wherein the overall length L of the lens optical system and the focal length f of the lens optical system satisfy the following inequality, $$1.0 < L/f < 2.5.$$

3. The lens optical system of claim 1, wherein an exit surface of the first lens is convex toward the image sensor.

4. The lens optical system of claim 1, wherein at least one of the first to third lenses is an aspherical lens.

5. The lens optical system of claim 1, wherein at least one of an incident surface and an exit surface of at least one of the first to third lenses is an aspherical surface.

6. The lens optical system of claim 1, wherein an exit surface of the fourth lens has one inflection point from a center portion toward an edge thereof.

7. The lens optical system of claim 1, wherein a center portion of the exit surface of the fourth lens is concave toward the image sensor and the exit surface of the fourth lens changes to be convex toward an edge thereof.

8. The lens optical system of claim 1, wherein the second and third lenses are aberration correction lenses.

9. The lens optical system of claim 1, further comprising an aperture arranged between the object and the first lens.

10. The lens optical system of claim 1, further comprising an aperture arranged between the first lens and the second lens.

11. The lens optical system of claim 1, further comprising an infrared ray prevention unit provided between the object and the image sensor.

12. The lens optical system of claim 11, wherein the infrared ray prevention unit is provided between the fourth lens and the image sensor.

13. The lens optical system of claim 1, wherein at least one of the first to fourth lenses is a plastic lens.

14. A lens optical system comprising first to fourth lenses that are sequentially arranged from an object, and which are between the object and an image sensor on which an image of the object is formed,
wherein the first lens has a positive (+) refractive power and an incident surface that is convex toward the object, the second lens has a negative (−) refractive power and both surfaces that are concave, the third lens has a positive (+) refractive power and has a meniscus shape that is convex toward the image sensor, and the fourth lens has a negative (−) refractive power and at least one of an incident surface and an exit surface thereof is an aspherical surface, and
wherein the lens optical system satisfies the following inequality, $$0.5 < |\tan \theta|/f < 1.5,$$

wherein "θ" denotes an angle of view of the lens optical system and "f" denotes a focal length of the lens optical system,
wherein the angle of view (θ) of the lens optical system is greater than or equal to 66°,
wherein a central portion of the incident surface of the fourth lens is convex toward the object and a portion around the central portion of the incident surface is concave toward the object,
wherein an exit surface of the first lens is concave toward the image sensor and the first lens has a meniscus shape that is convex toward the object,
wherein the incident surface of the fourth lens has three inflection points from the center portion toward an edge thereof,
wherein the center portion of the incident surface of the fourth lens is convex toward the object and the incident surface of the fourth lens gradually changes to be concave, convex, and concave from the center portion toward an edge thereof,
wherein the angle of view (θ) of the lens optical system is smaller than 70°, the focal length (f) of the lens optical system is smaller than 4.5 mm, and an overall length (L) of the lens optical system is smaller than 5 mm, and
wherein the lens optical system further comprises an aperture arranged between the first lens and the second lens.

* * * * *